United States Patent
Kobayashi et al.

(10) Patent No.: US 9,415,581 B2
(45) Date of Patent: Aug. 16, 2016

(54) IMAGE RECORDING METHOD

(71) Applicant: CANON KABUSHIKI KAISHA, Tokyo (JP)

(72) Inventors: Satoru Kobayashi, Yokohama (JP); Naofumi Shimomura, Kawasaki (JP); Masanori Jinnoh, Chita-gu (JP); Takashi Imai, Kawasaki (JP); Yutaka Kurabayashi, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/827,799

(22) Filed: Mar. 14, 2013

(65) Prior Publication Data

US 2013/0250020 A1    Sep. 26, 2013

(30) Foreign Application Priority Data

Mar. 26, 2012  (JP) ................. 2012-070104

(51) Int. Cl.
*B41J 2/005* (2006.01)
*C09D 11/107* (2014.01)
*B41M 5/025* (2006.01)

(52) U.S. Cl.
CPC ............ *B41J 2/0057* (2013.01); *B41M 5/0256* (2013.01); *C09D 11/107* (2013.01)

(58) Field of Classification Search
None
See application file for complete search history.

(56) References Cited

U.S. PATENT DOCUMENTS

| | | | |
|---|---|---|---|
| 3,853,778 A * | 12/1974 | Buckley et al. ............ 430/109.1 |
| 3,967,962 A * | 7/1976 | O'Malley ................. 430/123.52 |
| 4,538,156 A * | 8/1985 | Durkee et al. .................. 346/21 |
| 4,684,271 A * | 8/1987 | Wellman et al. ........... 400/241.1 |
| 5,394,226 A | 2/1995 | Beardsley et al. |
| 5,545,504 A | 8/1996 | Keoshkerian et al. |
| 5,814,685 A | 9/1998 | Satake et al. |
| 5,874,972 A * | 2/1999 | Suetsugu et al. ................ 347/55 |
| 5,990,202 A | 11/1999 | Nguyen et al. |
| 6,057,384 A | 5/2000 | Nguyen et al. |
| 6,075,105 A | 6/2000 | Keoshkerian et al. |
| 6,841,591 B2 | 1/2005 | Vincent et al. |
| 7,029,818 B2 | 4/2006 | Rohr et al. |
| 8,088,544 B2 | 1/2012 | Sacripante |
| 8,574,803 B2 | 11/2013 | Sacripante et al. |
| 2003/0066751 A1* | 4/2003 | May et al. ..................... 204/483 |
| 2003/0067528 A1* | 4/2003 | Chowdry et al. ............. 347/103 |

(Continued)

FOREIGN PATENT DOCUMENTS

| EP | 1132217 A1 | 9/2001 |
|---|---|---|
| JP | 7-32721 A | 2/1995 |

(Continued)

*Primary Examiner* — Michael P Rodriguez
(74) *Attorney, Agent, or Firm* — Canon U.S.A., Inc., IP Division (57) ABSTRACT

An image recording method includes recording an intermediate image by applying an ink to an intermediate transfer body, the ink containing a coloring material and polymer fine particles; and transferring the intermediate image onto a recording medium while heating the intermediate. The polymer fine particles are composed of a copolymer of a first compound that satisfies condition (1) (a polymer obtained by homopolymerization of the first compound is a crystalline polymer having a melting point equal to or lower than a temperature of the transfer) and a second compound that satisfies condition (2) (a polymer obtained by homopolymerization of the second compound is an amorphous polymer having a glass transition point equal to or lower than the temperature of the transfer).

12 Claims, 1 Drawing Sheet

(56) References Cited

U.S. PATENT DOCUMENTS

| | | |
|---|---|---|
| 2003/0219672 A1* | 11/2003 | Tavernier et al. ............. 430/114 |
| 2004/0131855 A1 | 7/2004 | Ganapathiappan |
| 2005/0048389 A1* | 3/2005 | Cheng et al. ............... 430/108.3 |
| 2005/0208414 A1 | 9/2005 | Nakamura et al. |
| 2006/0216625 A1 | 9/2006 | Maehata et al. |
| 2007/0028807 A1 | 2/2007 | Wallquist et al. |
| 2007/0224345 A1 | 9/2007 | Metz et al. |
| 2007/0227401 A1 | 10/2007 | Ganschow et al. |
| 2008/0057419 A1 | 3/2008 | Fujimoto et al. |
| 2008/0182192 A1 | 7/2008 | Farrugia et al. |
| 2008/0210124 A1 | 9/2008 | Keoshkerian et al. |
| 2009/0053409 A1* | 2/2009 | Yamamoto et al. ........... 427/195 |
| 2009/0062462 A1 | 3/2009 | Miyabayashi |
| 2010/0122642 A1 | 5/2010 | Farrugia et al. |
| 2010/0143837 A1* | 6/2010 | Klier et al. .................... 430/114 |
| 2010/0310272 A1 | 12/2010 | Mashtare et al. |
| 2012/0013694 A1* | 1/2012 | Kanke .......................... 347/103 |
| 2012/0162332 A1 | 6/2012 | McKean et al. |
| 2012/0236089 A1 | 9/2012 | Iftime et al. |
| 2013/0188239 A1 | 7/2013 | O'Keeffe |
| 2013/0250021 A1 | 9/2013 | Shimomura et al. |
| 2013/0251416 A1 | 9/2013 | Tominaga et al. |
| 2013/0251895 A1 | 9/2013 | Jinnou et al. |

FOREIGN PATENT DOCUMENTS

| | | |
|---|---|---|
| JP | 11-310739 A | 11/1999 |
| WO | 9923181 A1 | 5/1999 |
| WO | 9923182 A1 | 5/1999 |
| WO | 9923183 A1 | 5/1999 |

* cited by examiner

IMAGE RECORDING METHOD

BACKGROUND OF THE INVENTION

1. Field of the Invention

The present invention relates to an image recording method.

2. Description of the Related Art

There has been known an image recording method with which ink is applied to an intermediate transfer body to record an intermediate image and the intermediate image is transferred onto a recording medium (hereinafter this method may be referred to as "intermediate transfer-type image recording method"). In recent years, with the increasing demand for high-speed recording, intermediate transfer-type image recording methods with which high-quality images are obtained even at high transfer rates have been the focus of the studies. According to intermediate transfer-type image recording methods, the efficiency of transferring intermediate images from intermediate transfer bodies to recording media significantly affects the quality of images obtained. Typically, in order to improve the transfer efficiency, an approach of using an ink that contains polymer fine particles (see Japanese Patent Laid-Open No. 7-32721 or '721 document hereinafter) has been studied. '721 document discloses that the transfer efficiency is improved by using an ink that contains polymer fine particles having a lowest film forming temperature of 50° C. or higher and heating the ink to a temperature equal to or greater than the lowest film forming temperature during transfer.

However, studies conducted by the inventors have found that the ink containing polymer fine particles disclosed in '721 document could not create quality images such as those expected recently when recording is conducted at a high transfer rate.

SUMMARY OF THE INVENTION

The present invention provides an image recording method with high transfer efficiency that enables formation of high-quality images at a high transfer rate. An image recording method according to the present invention includes recording an intermediate image by applying an ink to an intermediate transfer body, the ink containing a coloring material and polymer fine particles, and transferring the intermediate image onto a recording medium while heating the intermediate. The polymer fine particles are composed of a copolymer of a first compound that satisfies condition (1) below and a second compound that satisfies condition (2) below:
Condition (1): A polymer obtained by homopolymerization of the first compound is a crystalline polymer having a melting point equal to or lower than a temperature of the transfer.
Condition (2): A polymer obtained by homopolymerization of the second compound is an amorphous polymer having a glass transition point equal to or lower than the temperature of the transfer.

Further features of the present invention will become apparent from the following description of exemplary embodiments with reference to the attached drawings.

DESCRIPTION OF THE EMBODIMENTS

The present invention will now be described in detail using embodiments. The inventors first studied the properties desirable for achieving high transfer efficiency in intermediate transfer-type image recording methods. As a result, it was found that it is desirable to have both of the following properties: (a) that the intermediate image is robust and (b) that the adhesion of the intermediate image to a recording medium is high. The property (a) helps suppress occurrence of partial transfer of the intermediate image during the transfer from the intermediate transfer body to the recording medium. The property (b) facilitates transfer of the intermediate image onto the recording medium. The inventors have conducted studies on conditions for the polymer fine particles used in the ink that would help achieve the properties (a) and (b) above and reached the conclusion that the state of the polymer fine particles at a temperature at which the intermediate image is heated (hereinafter this temperature may be referred to as "transfer temperature") during the transfer step plays a significant role. The details thereof are as follows.

First, changes in the state of a polymer during heating are described. Roughly speaking, the state of a polymer may be either of two states, namely, a state in which molecules are regularly aligned (crystalline state) and a state in which molecules are not regularly aligned but form spheres or become entangled with one another (amorphous state). In general, a polymer that contains both portions in the crystal state and portions in the amorphous state is referred to as a "crystalline polymer" and a polymer that contains few or no portions in the crystal state is referred to as an "amorphous polymer". Note that it is very difficult to synthesize a polymer that has no portions in the amorphous state and thus is entirely constituted by portions in the crystal state. A polymer is classified as either one of crystalline polymer and amorphous polymer.

Figure 1:
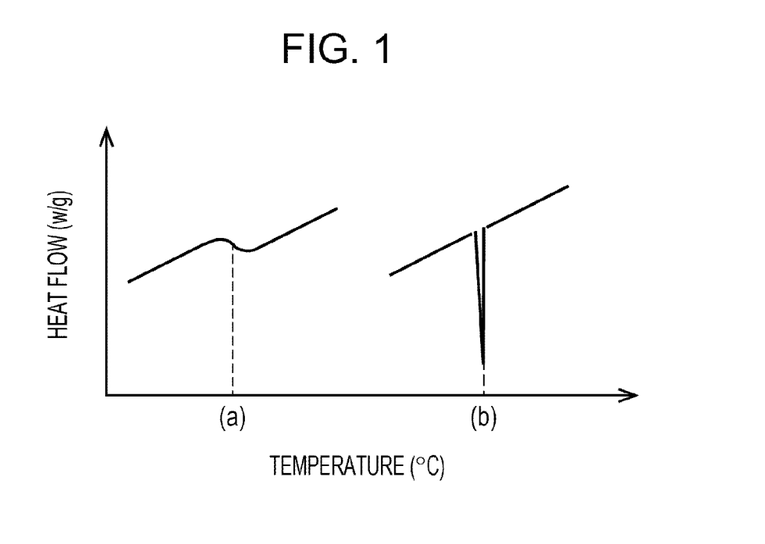
FIG. 1 is a graph showing a glass transition point and a melting point in a temperature-heat flow curve obtained by differential scanning calorimetry.

A crystalline polymer and an amorphous polymer differ significantly from each other in terms of changes of state that occur with changes in temperature. A crystalline polymer undergoes clear changes in state from glassy to rubbery and to liquid with increasing temperature. The points of changes between these states define the glass transition point (Tg) and the melting point (Tm), respectively. In contrast, an amorphous polymer changes from a glassy state to a rubbery state at Tg but then gradually enters a liquid state or decomposes into molecules with further heating, resulting in the absence of a definite point of change (Tm) from the rubbery state to the liquid state. The reason for such a significant difference in changes of state with changes in temperature between a crystalline polymer and an amorphous polymer is as follows. In both a crystalline polymer and an amorphous polymer, the change in state from a glassy state to a rubbery state occurs due to the change in mobility of amorphous portions in the polymer. As heating is continued, a change from a rubbery state to a liquid state occurs in both a crystalline polymer and an amorphous polymer. However, whereas a particular level or more of thermal energy (this corresponds to Tm) is required to break tightly linked crystal lattices of a crystalline polymer, an amorphous polymer does not have a crystal lattice and enters a liquid state because molecules that had been forming spheres or becoming entangled with each other are gradually set free due to the increase in thermal motion caused by heating, resulting in the absence of a clear Tm. In general, the Tg of an amorphous polymer is higher than the Tg of a crystalline polymer. This is because an amorphous polymer requires a larger amount of thermal energy (corresponds to Tg) than a crystalline polymer in order to bring about changes in the mobility of the amorphous portions. Note that Tg and Tm of a polymer can be measured with a differential scanning calorimeter (DSC). In particular, the temperature at which a temperature drop occurs in the base line of a temperature-heat flow curve obtained by DSC measurement shown in part (a) of FIG. 1 is assumed to be the glass transition point (Tg) and the temperature at which an endothermic peak (peak of trough) as shown in part (b) of FIG. 1 occurs is assumed to be the melting point (Tm). Detailed measurement conditions for DSC measurement are described below.

The inventors have conducted studies on the relationship between the properties and changes in state with changes in temperature for various types of crystalline polymer fine particles and amorphous polymer fine particles and made the following findings. The image transfer efficiency was low when an ink containing crystalline polymer fine particles was used to record an intermediate image on an intermediate transfer body and transfer was conducted at a transfer temperature equal to or higher than the Tm of the polymer fine particles, that is, when crystalline polymer fine particles in a liquid state were transferred. The inventors studied the state of the intermediate transfer body after the transfer and found that the intermediate image partly remained on the intermediate transfer body. However, the adhesion between the recording medium and the rest of the image transferred was significantly high. This is presumably because the property (a) was weak and the property (b) was strong.

In contrast, when an ink containing amorphous polymer fine particles was used to record an intermediate image on an intermediate transfer body and transfer was conducted by performing heating at a transfer temperature equal to or higher than the Tg of the polymer fine particles, that is, when amorphous polymer fine particles in a rubbery state were transferred, transfer onto a recording medium was successful in some cases but unsuccessful in other cases and thus the image transfer efficiency was low on average. However, among the cases where transfer was unsuccessful, there were more cases in which the entire intermediate image remained on the intermediate transfer body than cases in which only part of the intermediate image remained on the intermediate transfer body. Moreover, the adhesion between the transferred image and the recording medium was low. This is presumably because the property (a) was strong and the property (b) was weak.

These results illustrate that there is a trade-off relationship between the property (a) and the property (b). The inventors then thought that favorable properties of both crystalline polymer and amorphous polymer may be achieved by using an ink containing two types of polymer fine particles, i.e., crystalline polymer fine particles and amorphous polymer fine particles, to record an intermediate image on an intermediate transfer body and conducting transfer by performing heating at a transfer temperature equal to or higher than the Tm of the crystalline polymer fine particles and equal to or higher than the Tg of the amorphous polymer fine particles. However, studies that compared the case in which an ink containing both types of polymer fine particles was used with the case in which inks each containing only one of the types of polymer fine particles were used have found that the transfer efficiency was still insufficient although some improvements were seen, and high-quality images were not obtained. Further studies conducted by the inventors have found that the cause of this is that the two types of polymer fine particles contained in the ink used to record an intermediate image were not evenly dispersed and there were some portions where favorable properties of the two types of polymer fine particles were not exhibited. The inventors then conducted studies by focusing on the structure of the polymer fine particles and made the present invention.

The polymer fine particles used in the ink in the present invention is composed of a copolymer of a first compound that satisfies condition (1) (a polymer obtained by homopolymerization of a first compound is a crystalline polymer having a melting point equal to or lower than the transfer temperature described above) and a second compound that satisfies condition (2) (a polymer obtained by homopolymerization of a second compound is an amorphous polymer having a glass transition point equal to or lower than the transfer temperature described above). Due to this feature, the unit derived from the first compound in the polymer fine particles behaves like a crystalline polymer and the unit derived from the second compound behaves like an amorphous polymer. As a result, since two states (liquid state and rubbery state) co-exist in the polymer fine particles, both the property (a) and property (b) can be evenly exhibited in the intermediate image. Thus, the transfer efficiency is markedly improved since the entire intermediate image is transferred to the recording medium due to achievement of the property (a) and property (b) which have been in a trade-off relationship in the related art. Note that in confirming whether the homopolymers obtained from the first and second compounds are crystalline or amorphous, the weight-average molecular weights of the homopolymers may be increased to 10,000 or more.

The inventors have found that the content (mass %) of the unit derived from the first compound in the polymer fine particles may be at least 0.33 times but not more than 3.00 times the content (mass %) of the unit derived from the second compound on a mass ratio basis. When the content of the unit derived from the first compound is less than 0.33 times the content of the unit derived from the second compound, the content of the unit derived from the second compound, i.e., the content of the amorphous polymer, is large, the property (b) is weak, and thus the image transfer efficiency may not be sufficiently improved. In contrast, when the content of the unit derived from the first compound is more than 3.00 times the content of the unit derived from the second compound, the content of the unit derived from the first compound, i.e., the content of the crystalline polymer, is large, the property (a) is weak, and thus the image transfer efficiency may not be sufficiently improved.

Based on the above-mentioned mechanism, the reason for failing to obtain high-quality images with an ink containing polymer fine particles described in '721 document is presumably as follows. In '721 document, the polymer fine particles are specified through the minimum film forming temperature (MFT). MFT is the lowest temperature necessary for causing fusion between polymer fine particles and forming films and is typically close to Tg. In other words, if heating is conducted at a transfer temperature equal to or higher than MFT, the polymer fine particles are transferred in a liquid state (case where Tm≤transfer temperature) or in a rubbery state (case where Tm>transfer temperature). Accordingly, one of the property (a) and property (b) was insufficient and thus high-quality images were not obtained.

Image Recording Method

An image recording method according to the present invention includes a step (A) of applying an ink to an intermediate transfer body to record an intermediate image and a step (B) of heating the intermediate image to a transfer temperature and transferring the heated intermediate image onto a recording medium. In the step (A), an ink jet method may be used to apply the ink to the intermediate transfer body. In particular, the ink may be discharged from discharge ports of a recording head by causing thermal energy to act on the ink.

In the step (B), a recording medium is brought into contact with the intermediate image recorded on the intermediate transfer body and the intermediate image is heated to a transfer temperature and transferred onto the recording medium. As a result, an image can be recorded on the recording medium. In the present invention, the recording medium is not only paper typically used in printing but may be any of a wide range of products including cloth, plastic, and a film. The recording medium used in the image recording method of the present invention may be cut into a desired size in advance or may be a rolled sheet such that the sheet is cut into a desired size after images are recorded. Examples of the method for heating the intermediate image to a transfer temperature include a method with which a roller is heated to a predetermined transfer temperature in advance and a method with which a heater is separately provided. The transfer temperature may be set in accordance with the polymer fine particles used and can be 25° C. or higher and 200° C. or lower. In transferring the intermediate image onto the recording medium, pressure may be applied from both sides of the intermediate transfer body and the recording medium by using, for example, a pressure roller. Applying pressure helps improve transfer efficiency. The pressure may be applied in multiple stages. As discussed earlier, with the increase in demand for high-speed recording in recent years, high transfer efficiency is desirably achieved at high transfer rates. Accordingly, the transfer rate is preferably 1.0 m/sec or more and more preferably 2.0 m/sec or more.

A step of applying a liquid composition to the intermediate transfer body may be provided before or after the step (A). The liquid composition may contain a reacting agent that allows components (coloring material, resins, etc.) of the ink to precipitate and agglomerate. The liquid composition may be applied to the intermediate transfer body by an ink jet method, a coating method such as a roller coating method, a bar coating method, or a spray-coating method, or the like. In particular, a coating method may be employed. Examples of the reacting agent include polyvalent metal ions and organic acids.

A step of decreasing the amount of excessive liquid component in the recorded intermediate image may be provided before the step (B). The amount of the liquid component may be decreased by any common method. For example, a heating method, a method including blowing low-moisture air, a method including reducing pressure, a method that uses an absorbent that makes contact with the liquid component, or any combination of these methods may be employed.

A step of pressurizing the recording medium having a transferred image by using a roller or the like may be provided after the step (B). Pressurizing will increase the flatness and smoothness of the image. The roller used in pressurizing the recording medium having a transferred image may be heated in advance. The fastness of the image can enhanced by pressurizing the image with the heated roller.

A step of cleaning the surface of the intermediate transfer body may be provided after the step (B). The intermediate transfer body may be cleaned by any common method. In particular, a method with which the intermediate transfer body is showered with a cleaning liquid, a method with which a wetted damping roller is pressed against the intermediate transfer body to wipe the surface, a method with which the intermediate transfer body is brought into contact with the cleaning liquid surface, a method with which remaining substances on the intermediate transfer body are wiped away with a wiper blade, a method of applying any of various types of energy to the intermediate transfer body, and any combination of these methods may be employed.

Figure 2:
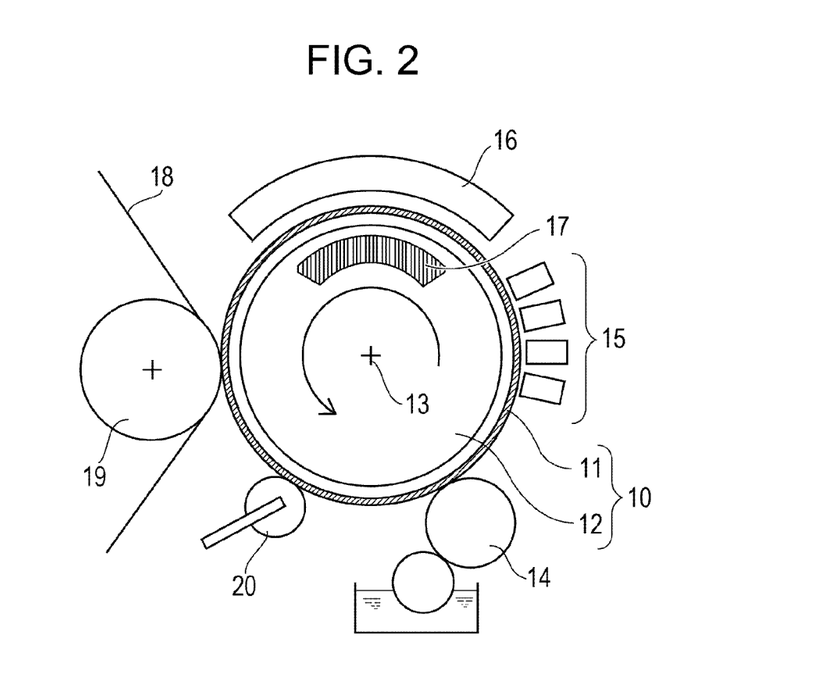
FIG. 2 is a schematic diagram illustrating an example of a structure of a recording apparatus used in the present invention.

FIG. 2 is a schematic diagram illustrating an example of an image recording apparatus used in the image recording method according to the present invention. An intermediate transfer body 10 of the image recording apparatus shown in FIG. 2 includes a rotatable supporting member 12 having a drum shape and a surface layer member 11 disposed on the outer peripheral surface of the supporting member 12. The surface layer member 11 is a layered member constituted by silicone rubber and a polyethylene terephthalate (PET) sheet. The surface layer member 11 is fixed to the outer peripheral surface of the supporting member 12 with a double-sided adhesive tape or the like. The intermediate transfer body 10 (supporting member 12) is rotated about a rotation axis 13 in the arrow direction (counterclockwise in the drawing). The components arranged around the intermediate transfer body 10 are configured to move in synchronization with the rotation of the intermediate transfer body 10. When a step of applying a liquid composition to the intermediate transfer body is provided, the liquid composition may be applied to the intermediate transfer body 10 by using an application roller 14 or the like. An ink is applied from a recording head 15 of an ink jet type, and an intermediate image which is a mirror image of a desired image is recorded on the intermediate transfer body 10. An air blower 16 or a heater 17 may be provided to perform a step of decreasing the amount of the excessive liquid component in the image. Next, a pressure roller 19 heated to a transfer temperature is used to bring the intermediate transfer body 10 into contact with a recording medium 18 and to thereby transfer the intermediate image onto the recording medium 18. A cleaning unit 20 may be provided to perform a step of cleaning the surface of the intermediate transfer body.

Ink

The ink used in the image recording method according to the present invention contains polymer fine particles. In the description below, "(meth)acrylic acid" refers to acrylic acid or methacrylic acid and "(meth)acrylate" refers to acrylate or methacrylate.

Polymer Fine Particles

For the purposes of the present invention, "polymer fine particles" refers to a polymer that is dispersed in the ink while having a particle diameter. In the present invention, a 50% cumulative volume mean diameter ($D_{50}$) of the polymer fine particles is preferably 30 nm or more and 500 nm or less and more preferably 150 nm or more and 300 nm or less. In Examples described below, $D_{50}$ of the polymer fine particles is measured by the following process: A polymer fine particle dispersion is diluted 50 fold (volume basis) with pure water and measurement is conducted by using UPA-EX150 (produced by Nikkiso Co., Ltd.) under conditions of SetZero: 30 s, number of runs: 3, measurement time: 180 seconds, and refractive index: 1.5.

The polystyrene-equivalent weight-average molecular weight of the polymer fine particles in the ink determined by gel permeation chromatography (GPC) is preferably 5,000 or more and 3,500,000 or less and more preferably 100,000 or more and 2,000,000 or less.

The polymer fine particles in the present invention may take any copolymer form that satisfies the feature of the present invention. Specific examples of the copolymer form include a random copolymer, a block copolymer, and a graft copolymer. Of these, a block copolymer and a graft copolymer are preferable. This is because the unit derived from the first compound and the unit derived from the second compound localize in the polymer fine particles of a black copolymer or a graft copolymer and thus both the property (a) and the property (b) can be effectively achieved.

In the present invention, the polymer fine particle content (mass %) in the ink may be 1.0 mass % of more relative to the total mass of the ink. If the polymer fine particle content is less than 1.0 mass %, the transfer efficiency improving effect may not be sufficiently obtained. The polymer fine particle content (mass %) in the ink may be 20.0 mass % or less relative to the total mass of the ink. At a polymer fine particle content exceeding 20.0 mass %, precipitation of the polymer fine particles may occur.

The polymer fine particle content (mass %) in the ink may be at least 0.5 times but not more than 20.0 times the coloring material content (mass %) in the ink on a mass ratio basis relative to the entire mass of the ink. If the polymer fine particle content is smaller than 0.5 times the coloring material content, the action of binding the coloring materials together is not sufficiently exhibited and the transfer efficiency improving effect may not be sufficiently obtained. If the polymer fine particle content is greater than 20.0 times the coloring material content, the amount of the polymer fine particles relative to the coloring material is large and vividness of the image may not be sufficiently obtained.

The method for synthesizing the polymer fine particles may be any common synthetic method such as an emulsion polymerization method, a seed polymerization method, a soap free emulsion polymerization method, or a suspension polymerization method. The first compound and the second compound which are the materials for the polymer fine particles are described below.

First Compound

In the present invention, the first compound is a compound that gives a crystalline polymer by homopolymerization. For the purposes of the present invention, "crystalline polymer" refers to a polymer that has both Tg and Tm as discussed above. A crystalline polymer in the present invention may have at least Tm in the range of 25° C. or higher and 200° C. or lower, which is the range of the transfer temperature. In the present invention, the polymer obtained by homopolymerization of the first compound needs to have Tm lower than the transfer temperature. For example, Tm may be 150° C. or lower.

The first compound used in the present invention may be any compound that satisfies the condition (1) described above. Examples of such a compound include (meth)acrylic acid alkyl esters having 12 or more carbon atoms in the alkyl chain, such as lauryl (meth)acrylate, tridecyl (meth)acrylate, hexadecyl (meth)acrylate, octadecyl (meth)acrylate, icosyl (meth)acrylate, henicosyl (meth)acrylate, and tetracosyl (meth)acrylate; and olefins such as polyethylene and polypropylene. These may be used alone or in combination as needed. The first compound is preferably at least one selected from (meth)acrylic acid alkyl esters having 12 or more carbon atoms in the alkyl chain and more preferably at least one selected from lauryl (meth)acrylate, hexadecyl (meth)acrylate, and octadecyl (meth)acrylate.

Second Compound

In the present invention, "second compound is a compound that gives an amorphous polymer by homopolymerization. For the purposes of the present invention, "amorphous polymer" refers to a polymer that has Tg but not Tm. The amorphous polymer may have Tg but not Tm in the range of 25° C. or higher and 200° C. or lower, which is the range of the transfer temperature. In the present invention, the polymer obtained by homopolymerization of the second compound needs to have Tg lower than the transfer temperature. This Tg is preferably 20° C. or more 150° C. or lower.

The second compound used in the present invention may be any compound that satisfies the condition (2) described above. Examples of such a compound include (meth)acrylic acid alkyl esters having 1 or more and 11 or less carbon atoms in the alkyl chain, such as methyl (meth)acrylate, propyl (meth)acrylate, n-butyl (meth)acrylate, tert-butyl (meth)acrylate, hexyl (meth)acrylate, and decyl (meth)acrylate; (meth)acrylic acid alkyl esters having cyclic structures, such as phenyl (meth)acrylate and cyclohexyl (meth)acrylate; and aromatic vinyl compounds such as styrene and α-methylstyrene. The second compound is preferably at least one selected from (meth)acrylic acid alkyl esters having 1 or more and 11 or less carbon atoms in the alkyl chain and more preferably at least one selected from propyl (meth)acrylate, n-butyl (meth)acrylate, and tert-butyl (meth)acrylate.

Method for Analyzing Polymer Fine Particles

The composition and physical properties of the obtained polymer fine particles can be analyzed by a common method. Although analysis can be conducted on a polymer fine particle dispersion and an ink containing polymer fine particles, accuracy can be further enhanced by separating the polymer fine particles in advance. For example, a polymer fine particle dispersion or an ink may be centrifuged at 10,000 rpm for 30 minutes and polymer fine particles can be obtained from the supernatant.

The polymer fine particles obtained as above was subjected to pyrolysis gas chromatography/mass spectroscopy (GC/MS), a nuclear magnetic resonance method (NMR), a Fourier transform infrared (FT-IR) spectroscopy, or the like to identify the compound species constituting the polymer constituting the polymer fine particles and determining their contents, and to analyze the copolymer form of the polymer fine particles.

Whether the polymer fine particles are composed of a copolymer of two or more compounds can be identified by the following method. The polymer fine particles are analyzed by NMR or FT-IR. If the polymer fine particles have a spectrum derived from a chemical bond between compounds constituting the polymer fine particles, the polymer fine particles are composed of a copolymer of two or more compounds.

If compound species constituting the polymer fine particles are identified by the above-mentioned method, the homopolymers thereof can be synthesized and analyzed to determine Tm and Tg. Then whether the compounds satisfy the conditions (1) and (2) can be determined from Tm and Tg. Tm and Tg can be measured by DSC, as discussed above. A specific procedure for measuring Tm and Tg is as follows. First, the separated polymer is dried into a solid form at 60° C. and 2 mg of the dried polymer is sealed in an aluminum container. Then Tm and Tg are measured by using a temperature program (thermal analysis is conducted while increasing the temperature at 10° C./min up to 200° C., decreasing temperature at 5° C./min from 200° C. to −50° C., and increasing the temperature at 10° C./min from −50° C. to 200° C.) with a measuring instrument, DSC Q1000 (produced by TA Instruments).

The weight-average molecular weight and the number-average molecular weight of each separated polymer are determined by GPC measurement. The procedure of the GPC measurement in Examples of the present invention is as follows. A sample for GPC measurement is obtained by adding the polymer separated as described above to THF, leaving the polymer in THF to stand still for several hours to dissolve the polymer, and filtering the resulting solution through a solvent-resistant membrane filter (trade name: TITAN2 Syringe Filter, PTFE produced by SUN-SRi) with a 0.45 μm pore size. The sample is prepared such that the polymer fine particle content in the sample is 0.1 mass % or more and 0.5 mass % or less. The average molecular weight of the sample is calculated with instrument: Alliance GPC 2695 (produced by Waters), column: four-column combination of Shodex KF-806M (produced by Showa Denko K.K.), and detector: RI (refractive index) by using polystyrene standards, PS-1 and PS-2 (produced by Polymer Laboratories).

Coloring Material

Examples of the coloring material used in the present invention include pigments and dyes. Any common pigments and dyes can be used. In the present invention, a pigment may be used from the viewpoint of water resistance of the image. The coloring material content (mass %) is preferably 0.1 mass % or more and 15.0 mass % or less and more preferably 1.0 mass % or more and 10.0 mass % or less relative to the total mass of the ink.

In the cases where a pigment is used as a coloring material in the present invention, examples of the types of pigments that can be used in terms of form of dispersion include polymer-dispersion type pigments that use resins as dispersants (polymer-dispersion pigments that use polymer dispersants, microcapsule pigments constituted by pigment particles having polymer-coated surfaces, and polymer-bonded pigments in which organic groups that contain resins are chemically bonded to surfaces of pigment particles) and self-dispersion type pigments in which hydrophilic groups are introduced to surfaces of pigment particles. Naturally, pigments with different dispersion forms can be used in combination. In particular, carbon black and organic pigments may be used as the pigments. One or a combination of two or more pigments can be used. When the pigment used in the ink is a polymer-dispersion type pigment, a polymer is used as a dispersant. The polymer used as the dispersant may have a hydrophilic moiety and a hydrophobic moiety. Specific examples of such a polymer include acrylic resins prepared by polymerizing carboxyl group-containing monomers such as acrylic acid and methacrylic acid; and urethane resins prepared by polymerizing diols having anionic groups such as dimethylolpropionic acid. The acid value of the polymer used as the dispersant may be 50 mgKOH/g or more and 300 mgKOH/g or less. The polystyrene equivalent weight-average molecular weight (Mw) of the polymer used as the dispersant according to GPC may be 1,000 or more and 15,000 or less. The polymer dispersant content (mass %) in the ink relative to the total mass of the ink is 0.1 mass % or more and 10.0 mass % or less and preferably 0.2 mass % or more and 4.0 mass % or less. The ratio of the polymer dispersant content (mass %) to the pigment content (mass %) may be 0.1 or more and 1.0 or less on a mass ratio basis.

Aqueous Medium

The ink according to the present invention may contain an aqueous medium which is water or a mixed solvent of water and a water-soluble organic solvent. The water-soluble organic solvent content (mass %) in the ink may be 3.0 mass % or more and 50.0 mass % or less relative to the total mass of the ink. Any common water-soluble organic solvent can be used as the water-soluble organic solvent. Examples thereof include alcohols, glycols, alkylene glycols with 2 to 6 carbon atoms in the alkylene group, polyethylene glycols, nitrogen-containing compounds, and sulfur-containing compounds. These water-soluble organic solvents can be used alone or in combination as needed. Water may be deionized water (ion exchange water). The water content (mass %) in the ink may be 50.0 mass % or more and 95.0 mass % or less relative to the total mass of the ink.

Other Components

The ink of the present invention may contain a water-soluble organic compound that is solid at normal temperature, such as a polyhydric alcohol, e.g., trimethylol propane or trimethylol ethane, urea, or a urea derivative such as ethyleneurea, in addition to the components described above, if needed. The ink of the present invention may contain various additives such as a surfactant, a pH adjustor, an antirust agent, a preservative, a fungicide, an antioxidant, a reducing inhibitor, an evaporation promoter, a chelating agent, and a polymer other than the polymer fine particles described above, if needed.

EXAMPLES

The present invention will now be described in further detail below by using Examples and Comparative Examples. Examples below do not limit the scope of the present invention. In Examples below, "part" means part by mass unless otherwise noted. Meaning of the abbreviated expressions used in the description and tables is as follows:

HDMA: hexadecyl methacrylate

PMA: propyl methacrylate

ODA: octadecyl acrylate

MMA: methyl methacrylate nBMA: n-butyl methacrylate

LA: lauryl acrylate

Preparation of Ink

Preparation of Polymer Fine Particle Dispersions

Preparation of Polymer Fine Particle Dispersions 1 to 5 and 8 to 15

The first compound (A parts), the second compound (B parts), n-hexadecane (2.0 parts), and 2,2'-azobis-(2-methylbutyronitrile) (2.0 parts) were mixed and stirred for 30 minutes. The resulting mixed solution was added to 76.0 parts of a 5.0 mass % aqueous solution of a surfactant, Nikkol BC15 (produced by Nikko Chemicals Co., Ltd.) dropwise, followed by stirring for 30 minutes. Then the mixture was dispersed by using an ultrasonic wave irradiation device S-150D Digital Sonifier (produced by BRANSON) under conditions of 400 W, 20 kHz, and 3 hours and then polymerization was carried out in a nitrogen atmosphere at 80° C. for 4 hours. As a result, a polymer fine particle dispersion (polymer content: 20.0 mass %) was obtained. The conditions for preparing each polymer fine particle dispersion are shown in Table 1. In Table 1, Tm and Tg are Tm and Tg of a polymer obtained by homopolymerization of a compound used (weight-average molecular weight of 10,000 or more) determined by DSC measurement according to the above-described procedure. The 50% cumulative volume mean diameter $D_{50}$ and the weight-average molecular weight of the polymer fine particles contained in the polymer fine particle dispersion were measured by the above-described procedure. The properties of each polymer fine particle dispersion is shown in Table 2.

TABLE 1

| Polymer fine particle dispersion No. | First compound | | | | Second compound | | | |
|---|---|---|---|---|---|---|---|---|
| | Type | Tg (° C.) | Tm (° C.) | Amount added, A (parts) | Type | Tg (° C.) | Tm (° C.) | Amount added, B (parts) |
| Polymer fine particle dispersion 1 | HDMA | — | 22 | 5.00 | PMA | 35 | — | 5.00 |
| Polymer fine particle dispersion 2 | HDMA | — | 22 | 2.31 | PMA | 35 | — | 7.69 |
| Polymer fine particle dispersion 3 | HDMA | — | 22 | 2.48 | PMA | 35 | — | 7.52 |
| Polymer fine particle dispersion 4 | HDMA | — | 22 | 7.50 | PMA | 35 | — | 2.50 |
| Polymer fine particle dispersion 5 | HDMA | — | 22 | 7.56 | PMA | 35 | — | 2.44 |
| Polymer fine particle dispersion 8 | LA | — | 12 | 5.00 | nBMA | 20 | — | 5.00 |
| Polymer fine particle dispersion 9 | HDMA | — | 22 | 5.00 | MMA | 105 | — | 5.00 |
| Polymer fine particle dispersion 10 | ODA | — | 56 | 5.00 | PMA | 35 | — | 5.00 |
| Polymer fine particle dispersion 11 | MMA | 35 | — | 5.00 | nBMA | 20 | — | 5.00 |
| Polymer fine particle dispersion 12 | HDMA | — | 22 | 5.00 | LA | — | 12 | 5.00 |
| Polymer fine particle dispersion 13 | HDMA | — | 22 | 10.00 | — | — | — | — |
| Polymer fine particle dispersion 14 | — | — | — | — | PMA | 35 | — | 10.00 |
| Polymer fine particle dispersion 15 | — | — | — | — | MMA | 105 | — | 10.00 |

Preparation of Polymer Fine Particle Dispersion 6

In a 0.5 L reactor purged with nitrogen and then evacuated, 50 g of PMA was placed while the interior of the reactor was in a vacuum state. Thereto, 0.52 g of copper(I) iodide serving as a catalyst was added, followed by stirring at 30° C. for 15 minutes. A solution of 0.52 g of dimethyl 2,3-dibromosuccinate serving as a polymerization initiator dissolved in 6.9 g of THF was added thereto, and the mixture was heated to 75° C. and stirred for 30 minutes. Then 0.07 g of tetramethylethylenediamine (TMEDA) serving as a catalyst activator was added to start polymerization of PMA. Thirty minutes after the start of polymerization, additional 0.07 g of TMEDA was added. As soon as the monomer conversion rate for PMA reached 97.2%, 82.5 g of THF, 0.40 g of copper(I) bromide, and 50 g of HDMA were added. Then 0.07 g of TMEDA was further added to start polymerization of HDMA. Then 0.007 g of TMEDA was added thereto every hour, and as soon as the monomer conversion rate for HDMA reached 95.6%, THF was added so as to dilute the reaction mixture to a polymer content of 15 mass %. Then the reactor was cooled and polymerization was terminated by introducing a 6% oxygen mixed gas into the reactor for 1 hour. As a result, a solution of a HDMA-PMA block copolymer (the ratio of the unit derived from HDMA to the unit derived from PMA was 1.0) was obtained. Then 1200.0 g of water, 7.1 g of sodium hydroxide, and 10.0 g of Nikkol BC15 (produced by Nikko Chemicals Co., Ltd.) were placed in a flask and the temperature of the mixture was adjusted to 40° C. The HDMA-PMA block copolymer solution was added to the flask dropwise for 1 hour. Then stirring was carried out at 40° C. for 2 hours, the solvent such as THF was removed by vacuum distillation, and ion exchange water was added to obtain a polymer fine particle dispersion 6 (polymer content: 20.0 mass %). A polymer obtained by homopolymerization of HDMA used and a polymer obtained by homopolymerization of PMA used (weight-average molecular weight of 10,000 or more for both resins) were analyzed by DSC. HDMA had Tm of 22° C. and PMA had Tg of 35° C. The 50% cumulative volume mean diameter $D_{50}$ and the weight-average molecular weight of the polymer fine particles contained in the resulting polymer fine particle dispersion 6 were measured by the above-described procedures. The properties of the polymer fine particle dispersion 6 are shown in Table 2.

Preparation of Polymer Fine Particle Dispersion 7

HDMA (5.0 parts), MMA macromonomer AA-6 (produced by Toagosei Co., Ltd.) (5.0 parts), and 2,2'-azobis-(2-methylbutyronitrile) (2.0 parts) were mixed and stirred for 30 minutes. The resulting mixed solution was added to 76.0 parts of a 5.0 mass % aqueous solution of Nikkol BC15 (produced by Nikko Chemicals Co., Ltd.) dropwise, followed by stirring for 30 minutes. Then the mixture was dispersed by using an ultrasonic wave irradiation device S-150D Digital Sonifier (produced by BRANSON) under conditions of 400 W, 20 kHz, and 3 hours and then polymerization was carried out in a nitrogen atmosphere at 80° C. for 4 hours. As a result, a polymer fine particle dispersion 7 (polymer content: 20.0 mass %) of a MMA-HDMA graft copolymer (copolymer with a MMA polymer main chain and a HDMA polymer side chain) was obtained. A polymer obtained by homopolymerization of HDMA used and a polymer obtained by homopolymerization of MMA used (weight-average molecular weight of 10,000 or more for both resins) were analyzed by DSC. HDMA had Tm of 22° C. and MMA had Tg of 105° C. The 50% cumulative volume mean diameter $D_{50}$ and the weight-average molecular weight of the polymer fine particles contained in the resulting polymer fine particle dispersion 7 were measured by the above-described procedures. The properties of the polymer fine particle dispersion 7 are shown in Table 2.

TABLE 2

| Polymer fine particle dispersion No | Form of copolymer | Ratio of unit derived from first compound/ratio of unit derived from second compound | Weight-average molecular weight Mw | Volume mean diameter $D_{50}$ (nm) |
| --- | --- | --- | --- | --- |
| Polymer fine particle dispersion 1 | Random copolymer | 1.00 | 570000 | 121 |
| Polymer fine particle dispersion 2 | Random copolymer | 0.30 | 620000 | 101 |
| Polymer fine particle dispersion 3 | Random copolymer | 0.33 | 530000 | 109 |
| Polymer fine particle dispersion 4 | Random copolymer | 3.00 | 250000 | 167 |
| Polymer fine particle dispersion 5 | Random copolymer | 3.10 | 320000 | 106 |
| Polymer fine particle dispersion 6 | Block copolymer | 1.00 | 350000 | 105 |
| Polymer fine particle dispersion 7 | Graft copolymer | 1.00 | 420000 | 138 |
| Polymer fine particle dispersion 8 | Random copolymer | 1.00 | 600000 | 131 |
| Polymer fine particle dispersion 9 | Random copolymer | 1.00 | 520000 | 110 |
| Polymer fine particle dispersion 10 | Random copolymer | 1.00 | 540000 | 116 |
| Polymer fine particle dispersion 11 | Random copolymer | 1.00 | 290000 | 135 |
| Polymer fine particle dispersion 12 | Random copolymer | 1.00 | 270000 | 151 |
| Polymer fine particle dispersion 13 | — | — | 320000 | 132 |
| Polymer fine particle dispersion 14 | — | — | 380000 | 126 |
| Polymer fine particle dispersion 15 | — | — | 450000 | 120 |

Preparation of Polymer Fine Particle Dispersion 16

The polymer fine particle dispersion 13 (50.0 parts) and the polymer fine particle dispersion 14 (50.0 parts) obtained as above were mixed to obtain a polymer fine particle dispersion 16 (polymer content: 20.0 mass %).

Preparation of Pigment Dispersion
Preparation of Pigment Dispersion A

A styrene-ethyl acrylate-acrylic acid copolymer having an acid value of 150 mgKOH/g and a weight-average molecular weight of 8,000 was neutralized with a 10 mass % aqueous potassium hydroxide solution to obtain an aqueous polymer solution having a polymer content of 20.0 mass %. Then 15 parts of the aqueous polymer solution, 10 parts of carbon black MONARCH 1100 (produced by Cabot Corporation), and 75 parts of ion exchange water were mixed. The mixture was dispersed for 5 hours in a batch-type vertical sand mill (produced by AIMEX CO. Ltd.) with 200 parts of zirconia beads 0.3 mm in diameter, centrifuged to remove coarse particles, and pressure-filtered through a micro filter (produced by FUJIFILM Holdings Corporation) with a 3.0 μm pore size. As a result, a pigment dispersion A (pigment content: 10.0 mass %, polymer content: 3.0 mass %) in which carbon black is dispersed in water by polymer was obtained.

Preparation of Pigment Dispersion B

A pigment dispersion B (pigment content: 10.0 mass %) was obtained by diluting Cab-O-Jet200 (produced by Cabot Corporation), i.e., self-dispersion carbon black in which sulfonyl groups are bonded to the surfaces of carbon black particles, with water and thoroughly stirring the resulting mixture.

Preparation of Aqueous Dye Solution

An aqueous dye solution having a dye content of 10.0 mass % was obtained by using C.I. Direct black 195.

Preparation of Ink

The polymer fine particle dispersion obtained as above, and the pigment dispersion or the aqueous dye solution obtained as above were blended with components described below. Ion exchange water constitutes the balance so that all components constituting the ink add up to 100.0 mass %.

Pigment dispersion or aqueous dye solution (coloring material content: 10.0 mass %) X mass % in Table 3

Polymer fine particle dispersion (polymer content: 20.0 mass %) Y mass % in Table 3

| | |
| --- | --- |
| Glycerin | 10.0 mass % |
| Diethylene glycol | 4.0 mass % |
| Acetylenol E100 (surfactant produced by Kawaken Fine Chemicals Co., Ltd.) | 1.0 mass % |
| Ion exchange water | balance |

The mixture was thoroughly stirred to dispersion and pressure-filtered through a microfilter (produced by FUJIFILM Holdings Corporation) with a 3.0 μm pore size to prepare each ink.

Preparation of Liquid Composition

Glutaric acid (10 parts), diethylene glycol (10 parts), Acetylenol E100 (surfactant produced by Kawaken Fine Chemicals Co., Ltd.) (1 part), and ion exchange water (79 parts) were mixed and thoroughly stirred. Then the mixture was pressure-filtered through a microfilter (produced by FUJIFILM Holdings Corporation) with a 3.0 μm pore size. As a result, a liquid composition was obtained.

Evaluation of Transfer Efficiency

Each ink obtained as above was charged in an ink cartridge which was mounted to an image recording apparatus having a structure shown in FIG. 2. First, the liquid composition obtained as above was applied to an intermediate transfer body with an application roller. Then the ink was discharged from an ink jet recording head toward the intermediate transfer body to which the liquid composition was applied so as to record an intermediate image with 100% recording duty (solid image 2 cm×2 cm in size). Note that in this image recording apparatus, the definition of the 100% recording duty is that recording was conducted under conditions of applying 8 dots of 3.5 ng ink droplets in a unit region of 1/600 inch×1/600 inch in size at a resolution of 600 dpi×600 dpi. Then the intermediate image was transferred onto a recording medium at a transfer rate of 1.0 m/sec by using a pressure roller heated to a transfer temperature (50° C. or 150° C.) indicated in Table 3. A series of these steps was repeated 25 times and then the ratio of the intermediate image remaining on the intermediate transfer body, i.e., the transfer residual ratio (%), was calculated. In particular, the transfer residual ratio was determined by removing the intermediate transfer body from the supporting member, taking an image of the surface of the intermediate transfer body, and calculating the ratio of the area of the untransferred intermediate image remaining on the intermediate transfer member in the area in which the intermediate image was recorded. The transfer efficiency was then evaluated from the transfer residual ratio. The evaluation standard is as follows. In the present invention, ratings AA, A, and B in the evaluation standard below are acceptable and rating C is unacceptable. The evaluation results are shown in Table 3.

AA: Transfer residual ratio was 2% or less and the transfer efficiency was excellent.

A: Transfer residual ratio was greater than 2% but not greater than 10% and transfer efficiency was high.

B: Transfer residual ratio was greater than 10% but not greater than 15%, and transfer efficiency was moderately high.

C: The transfer residual ratio was greater than 15% and the transfer efficiency was low.

TABLE 3

| Example No. | Transfer temperature (° C.) | Ink No | Pigment dispersion or aqueous dye solution Coloring material content: 10.0 mass % Type | Pigment dispersion or aqueous dye solution content X in the ink (mass %) | Coloring material (solid matter) content in the ink (mass %) | Polymer fine particle dispersion Polymer content: 20.0 mass % Type | Polymer fine particle dispersion content Y in the ink (mass %) | Polymer (solid matter) content in the ink (mass %) | Polymer content/coloring material content | Evaluation results Transfer efficiency |
|---|---|---|---|---|---|---|---|---|---|---|
| Example 1 | 50 | Ink 1 | Pigment dispersion A | 20.0 | 2.0 | Polymer fine particle dispersion 1 | 50.0 | 10.0 | 5.0 | A |
| Example 2 | 50 | Ink 2 | Pigment dispersion B | 20.0 | 2.0 | Polymer fine particle dispersion 1 | 50.0 | 10.0 | 5.0 | A |
| Example 3 | 50 | Ink 3 | Aqueous dye solution | 20.0 | 2.0 | Polymer fine particle dispersion 1 | 50.0 | 10.0 | 5.0 | A |
| Example 4 | 50 | Ink 4 | Pigment dispersion A | 40.0 | 4.0 | Polymer fine particle dispersion 1 | 8.0 | 1.6 | 0.4 | B |
| Example 5 | 50 | Ink 5 | Pigment dispersion A | 40.0 | 4.0 | Polymer fine particle dispersion 1 | 10.0 | 2.0 | 0.5 | A |
| Example 6 | 50 | Ink 6 | Pigment dispersion A | 5.0 | 0.5 | Polymer fine particle dispersion 1 | 50.0 | 10.0 | 20.0 | A |
| Example 7 | 50 | Ink 7 | Pigment dispersion A | 5.0 | 0.5 | Polymer fine particle dispersion 1 | 50.5 | 10.1 | 20.2 | A |
| Example 8 | 50 | Ink 8 | Pigment dispersion A | 20.0 | 2.0 | Polymer fine particle dispersion 2 | 50.0 | 10.0 | 5.0 | B |
| Example 9 | 50 | Ink 9 | Pigment dispersion A | 20.0 | 2.0 | Polymer fine particle dispersion 3 | 50.0 | 10.0 | 5.0 | A |
| Example 10 | 50 | Ink 10 | Pigment dispersion A | 20.0 | 2.0 | Polymer fine particle dispersion 4 | 50.0 | 10.0 | 5.0 | A |
| Example 11 | 50 | Ink 11 | Pigment dispersion A | 20.0 | 2.0 | Polymer fine particle dispersion 5 | 50.0 | 10.0 | 5.0 | B |
| Example 12 | 50 | Ink 12 | Pigment dispersion A | 20.0 | 2.0 | Polymer fine particle dispersion 6 | 50.0 | 10.0 | 5.0 | AA |
| Example 13 | 150 | Ink 13 | Pigment dispersion A | 20.0 | 2.0 | Polymer fine particle dispersion 7 | 50.0 | 10.0 | 5.0 | AA |
| Example 14 | 50 | Ink 14 | Pigment dispersion A | 20.0 | 2.0 | Polymer fine particle dispersion 8 | 50.0 | 10.0 | 5.0 | A |
| Comparative Example 1 | 50 | Ink 15 | Pigment dispersion A | 20.0 | 2.0 | Polymer fine particle dispersion 9 | 50.0 | 10.0 | 5.0 | C |
| Comparative Example 2 | 50 | Ink 16 | Pigment dispersion A | 20.0 | 2.0 | Polymer fine particle dispersion 10 | 50.0 | 10.0 | 5.0 | C |
| Comparative Example 3 | 50 | Ink 17 | Pigment dispersion A | 20.0 | 2.0 | Polymer fine particle dispersion 11 | 50.0 | 10.0 | 5.0 | C |
| Comparative Example 4 | 50 | Ink 18 | Pigment dispersion A | 20.0 | 2.0 | Polymer fine particle dispersion 12 | 50.0 | 10.0 | 5.0 | C |
| Comparative Example 5 | 50 | Ink 19 | Pigment dispersion A | 20.0 | 2.0 | Polymer fine particle dispersion 13 | 50.0 | 10.0 | 5.0 | C |
| Comparative Example 6 | 50 | Ink 20 | Pigment dispersion A | 20.0 | 2.0 | Polymer fine particle dispersion 14 | 50.0 | 10.0 | 5.0 | C |

TABLE 3-continued

| Example No. | Transfer temperature (° C.) | Ink No | Pigment dispersion or aqueous dye solution Coloring material content: 10.0 mass %) | | | Polymer fine particle dispersion Polymer content: 20.0 mass %) | | | Polymer content/ coloring material content | Evaluation results Transfer efficiency |
|---|---|---|---|---|---|---|---|---|---|---|
| | | | Type | Pigment dispersion or aqueous dye solution content X in the ink (mass %) | Coloring material (solid matter) content in the ink (mass %) | Type | Polymer fine particle dispersion content Y in the ink (mass %) | Polymer (solid matter) content in the ink (mass %) | | |
| Comparative Example 7 | 50 | Ink 21 | Pigment dispersion A | 20.0 | 2.0 | Polymer fine particle dispersion 15 | 50.0 | 10.0 | 5.0 | C |
| Comparative Example 8 | 50 | Ink 22 | Pigment dispersion A | 20.0 | 2.0 | Polymer fine particle dispersion 16 | 50.0 | 10.0 | 5.0 | C |

The image obtained in Example 7 (ink 7) had low vividness compared to Example 1 (ink 1) and Example 6 (ink 6).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-070104, filed Mar. 26, 2012 which is hereby incorporated by reference herein in its entirety.

What is claimed is:

1. An image recording method comprising:
   applying a liquid composition to an intermediate transfer body;
   recording an intermediate image by applying an ink by an inkjet method to the intermediate transfer body after the liquid composition has been applied, the ink containing a coloring material and polymer fine particles, and
   transferring the intermediate image onto a recording medium while heating the intermediate image,
   wherein the liquid composition contains a reacting agent to cause at least one of precipitation and agglomeration of a component of the ink,
   wherein the ink contains water, and the content (mass %) of the water in the ink is 50.0 mass % or more and 95.0 mass % or less relative to the total mass of the ink, and
   wherein the polymer fine particles are composed of a copolymer of a first compound that satisfies condition (1) below and a second compound that satisfies condition (2) below:
   Condition (1): a polymer obtained by homopolymerization of the first compound is a crystalline polymer having a melting point equal to or lower than a temperature of the intermediate image which is heated in transferring, and
   Condition (2): a polymer obtained by homopolymerization of the second compound is an amorphous polymer having a glass transition point equal to or lower than the temperature of the intermediate image which is heated in transferring.

2. The image recording method according to claim 1, wherein the content (mass %) of a unit derived from the first compound in the polymer fine particles is at least 0.33 times but not more than 3.00 times the content (mass %) of a unit derived from the second compound in the polymer fine particles.

3. The image recording method according to claim 1, wherein the content (mass %) of the polymer fine particles relative to a total mass of the ink is at least 0.5 times but not more than 20.0 times the content (mass %) of the coloring material relative to a total mass of the ink.

4. The image recording method according to claim 1, wherein the first compound is a (meth)acrylic acid alkyl ester having 12 or more carbon atoms in the alkyl chain.

5. The image recording method according to claim 1, wherein the second compound is a (meth)acrylic acid alkyl ester having 1 or more and 11 or less carbon atoms in the alkyl chain.

6. The image recording method according to claim 1,
   wherein the crystalline polymer comprises at least one of: a polymer of a (meth)acrylic acid alkyl ester having 12 or more carbon atoms in the alkyl chain; and an olefin polymer,
   wherein the amorphous polymer comprises at least one of: a polymer of a (meth)acrylic acid alkyl ester having 1 or more and 11 or less carbon atoms in the alkyl chain; a polymer of a (meth)acrylic acid alkyl ester having a cyclic structure; and a polymer of an aromatic vinyl compound, and
   wherein the intermediate image is heated to a temperature of from 25° C. to 200° C. in transferring the intermediate image onto the recording medium.

7. The image recording method according to claim 1,
   wherein the inkjet method contains discharging the ink from discharge ports of a recording head by causing thermal energy to act on the ink.

8. The image recording method according to claim 1,
   wherein the reacting agent is polyvalent metal ion or an organic acid.

9. The image recording method according to claim 1,
   wherein the crystalline polymer has melting point in the range of 25° C. or higher and 200° C. or lower.

10. The image recording method according to claim 1,
    wherein the amorphous polymer has a glass transition point in the range of 25° C. or higher and 200° C. or lower.

11. The image recording method according to claim 1,
    wherein the temperature of the transfer is from 25° C. to 200° C. when the intermediate image is transferred onto the recording medium.

12. The image recording method according to claim 1,
    wherein the crystalline polymer changes to a liquid state and the amorphous polymer changes to a rubbery state by heating the intermediate image.

* * * * *